(12) United States Patent
Owejan

(10) Patent No.: US 8,603,695 B2
(45) Date of Patent: Dec. 10, 2013

(54) FUEL CELL ASSEMBLY MANIFOLD HEATER FOR IMPROVED WATER REMOVAL AND FREEZE START

(75) Inventor: Jon P. Owejan, Honeoye, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1555 days.

(21) Appl. No.: 11/767,102

(22) Filed: Jun. 22, 2007

(65) Prior Publication Data
US 2008/0318100 A1 Dec. 25, 2008

(51) Int. Cl.
*H01M 8/04* (2006.01)
*H01M 8/24* (2006.01)

(52) U.S. Cl.
USPC .......................... 429/458; 429/429; 429/457

(58) Field of Classification Search
None
See application file for complete search history.

(56) References Cited

U.S. PATENT DOCUMENTS

| | | | | |
|---|---|---|---|---|
| 5,840,414 | A * | 11/1998 | Bett et al. | 428/307.7 |
| 6,406,807 | B1 * | 6/2002 | Nelson et al. | 429/413 |
| 2002/0051898 | A1 * | 5/2002 | Moulthrop et al. | 429/17 |
| 2002/0068202 | A1 | 6/2002 | Gebhardt et al. | |
| 2004/0142217 | A1 * | 7/2004 | Couch et al. | 429/13 |
| 2004/0157094 | A1 * | 8/2004 | Reiser et al. | 429/13 |

FOREIGN PATENT DOCUMENTS

| | | |
|---|---|---|
| DE | 11 2004 000 247 T5 | 5/2006 |
| DE | 11 2004 001 828 T5 | 8/2006 |
| JP | 61128472 A * | 6/1986 |
| JP | 2005190799 A * | 7/2005 |

OTHER PUBLICATIONS

Examiner Annotated Figure 7 of Kogami.*

* cited by examiner

*Primary Examiner* — Ula C Ruddock
*Assistant Examiner* — Matthew Van Oudenaren
(74) *Attorney, Agent, or Firm* — Fraser Clemens Martin & Miller LLC; J. Douglas Miller

(57) ABSTRACT

An apparatus for heating a fuel cell assembly is disclosed, wherein a means for heating is disposed in a manifold of the fuel cell assembly and the means for heating causes the manifold to be heated to militate against fluid condensation and ice formation in the fuel cell assembly.

20 Claims, 4 Drawing Sheets

FUEL CELL ASSEMBLY MANIFOLD HEATER FOR IMPROVED WATER REMOVAL AND FREEZE START

FIELD OF THE INVENTION

The invention relates to an apparatus for heating a fuel cell assembly, and more specifically to an apparatus for heating a manifold of the fuel cell assembly to militate against a fluid condensation and an ice formation in the fuel cell assembly.

BACKGROUND OF THE INVENTION

Fuel cell assemblies convert a fuel and an oxidant to electricity. One type of fuel cell power system employs use of a proton exchange membrane (hereinafter "PEM") to facilitate catalytic reaction of fuels (such as hydrogen) and oxidants (such as air or oxygen) to generate electricity. The PEM is a solid polymer electrolyte membrane that facilitates transfer of protons from an anode to a cathode in each individual fuel cell normally deployed in a fuel cell power system.

In a typical fuel cell assembly (or stack) within a fuel cell power system, individual fuel cell plates include channels through which various reactants and cooling fluids flow. Fuel cell plates are typically designed with serpentine flow channels. Serpentine flow channels are desirable as they effectively distribute reactants over the active area of an operating fuel cell, thereby maximizing performance and stability. In subzero temperatures, water vapor in the fuel cell assembly may condense. Further, the condensate may form ice in the fuel cell assembly. The presence of condensate and ice may affect the performance of the fuel cell assembly and may also cause damage to the fuel cell assembly.

During typical operation of the fuel cell assembly, waste heat from the fuel cell reaction heats the assembly and militates against vapor condensation and ice formation in the assembly. However, during typical operation conditions, condensate may accumulate at the edges of the fuel cell plates adjacent outlet manifolds thereof, thereby restricting fluid flow from the flow channels through the outlet manifolds. During a starting operation of the fuel cell assembly in subzero temperatures, the condensed water in the flow channels of the fuel cell plates and at edges of the outlet manifolds is in the form of ice within the fuel cell assembly which may result in damage to the fuel cell assembly as reactant flow is restricted. Similarly reactant flow maldistribution due to liquid water stagnation during normal operation can result in damage and instability.

Typically, to militate against the formation of condensation at the outlet manifolds of the fuel cell assembly, the operating temperature of the fuel cell assembly may be increased. However, increasing the operation temperature may have a negative impact on ohmic resistance due to membrane proton resistance as a result of decreased membrane humidification. Also, decreasing the inlet relative humidity of anode and cathode gas streams will achieve the same effect as increasing temperature and may also have have a negative impact on ohmic resistance due to membrane proton resistance.

It would be desirable to develop an apparatus for quickly and efficiently melting ice during start-up of the fuel cell stack in subfreezing temperatures and for heating the fuel cell assembly to militate against water condensation accumulation at the outlet manifolds of the fuel cell assembly and to militate against a subsequent formation of ice in the fuel cell assembly.

SUMMARY OF THE INVENTION

Concordant and congruous with the present invention, an apparatus for quickly and efficiently heating the fuel cell assembly to militate against ice blockage during system startup in subfreezing temperatures to militate against water condensation accumulation at the outlet manifolds of the fuel cell assembly to militate against water condensation accumulation at the outlet manifolds of the fuel cell assembly and to militate against a subsequent formation of ice in the fuel cell assembly, has surprisingly been discovered.

In one embodiment, a fuel cell assembly comprises a plurality of fuel cell plates, wherein each fuel cell plate includes a plurality of flow channels and at least a first aperture formed therein, each of the first apertures of the fuel cell plates are substantially aligned to form a first manifold in fluid communication with the flow channels, wherein a first fluid is caused to flow through the first manifold; and a first means for heating in thermal communication with an edge forming the first apertures, wherein said first means for heating is adapted to melt ice formed in said assembly during a startup operation and militates against at least one of fluid condensation and ice formation in said fuel cell assembly.

In another embodiment, a fuel cell assembly comprises a plurality of fuel cell plates, wherein each plate includes a plurality of flow channels and at least two apertures formed therein, each of the apertures of the fuel cell plates are substantially aligned to form a first manifold in fluid communication with the flow channels and a second manifold in fluid communication with the flow channels, wherein a first fluid is caused to flow through the first manifold and a second fluid is caused to flow through the second manifold; and a plurality of means for heating in thermal communication with an edge of the apertures, wherein said plurality of means for heating are adapted to melt ice formed in said assembly during a startup operation and militates against at least one of fluid condensation and ice formation in said fuel cell assembly.

In another embodiment, a fuel cell assembly comprises a plurality of fuel cell plates, wherein each plate includes a plurality of flow channels and at least an aperture formed therein, the aperture of the fuel cell plates substantially aligned to form a first manifold in fluid communication with the flow channels, wherein a first fluid is caused to flow through the first manifold; a first means for heating in thermal communication with an edge of the apertures of the fuel cell plates that form the first manifold, wherein the heated first manifold militates against vapor condensation and ice formation in said fuel cell assembly; and a hydrophilic material disposed on at least a portion of the fuel cell plates, wherein said porous hydrophilic material is adapted to facilitate the flow of condensation from the flow channels to the edge of the fuel cell plates.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1:
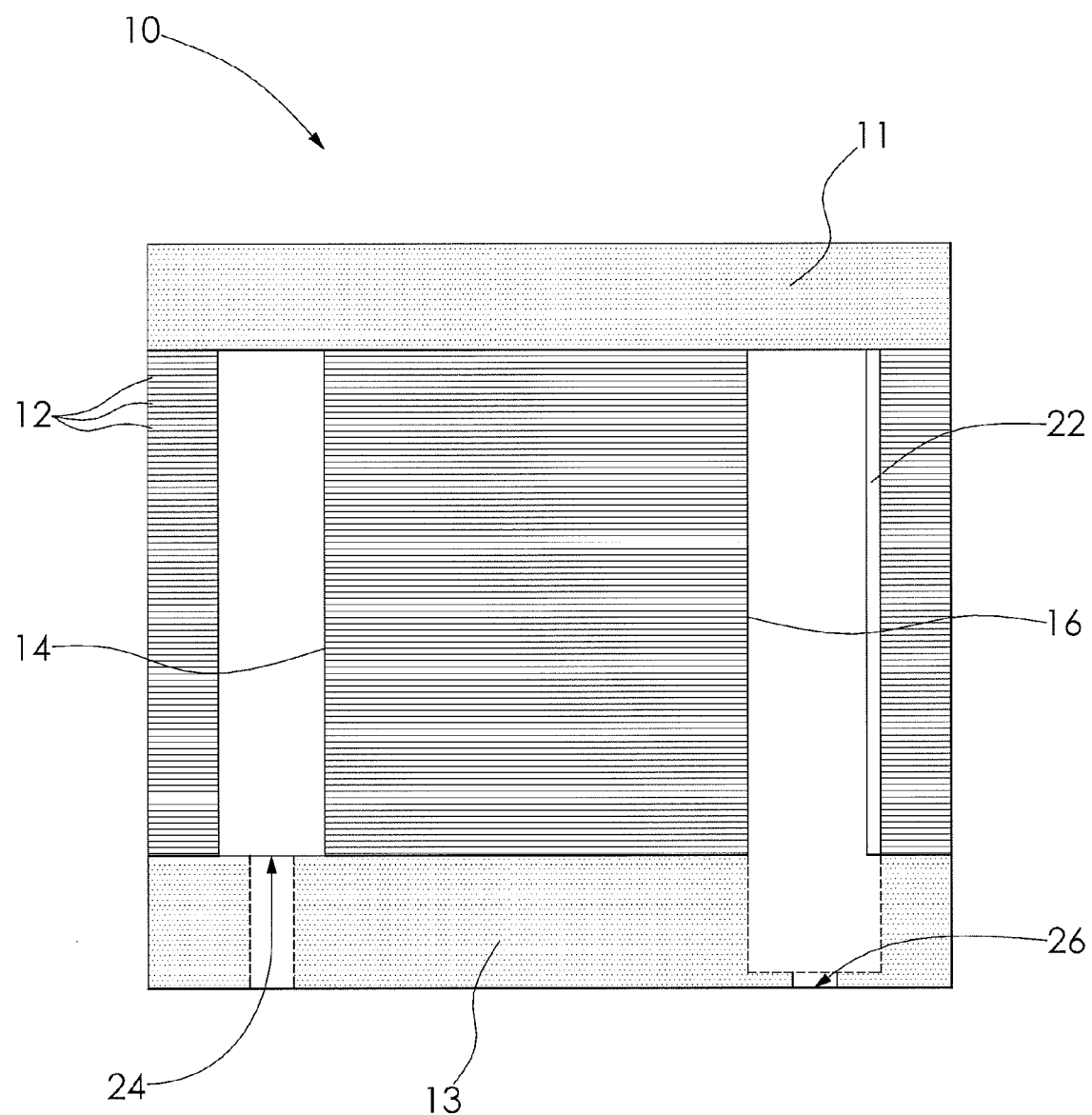
FIG. 1 is a cross-sectional elevational view of a fuel cell assembly including a means for heating according to an embodiment of the invention.

FIG. 1 shows a fuel cell assembly 10 according to an embodiment of the invention. The fuel cell assembly 10 includes a plurality of fuel cell plates 12 disposed between a top end plate 11 and a bottom end plate 13. An inlet manifold 14 and an outlet manifold 16 are formed in the fuel cell assembly 10 by the fuel cell plates 12.

The inlet manifold 14 includes an inlet 24. The inlet manifold 14 is formed in the fuel cell assembly 10 by inlet apertures (not shown) formed in each of the fuel cell plates 12. The fuel cell plates 12 are stacked with the inlet aperture of each fuel cell plate 12 substantially aligned with the inlet aperture of an adjacent fuel cell plate or plates 12. It is understood that the diameter, quantity, and length of the inlet manifold 14 will depend on the size and quantity of the inlet apertures in the fuel cell plates 12 and the number of plates 12 stacked in the fuel cell assembly 10.

The outlet manifold 16 includes an outlet 26. The outlet manifold 16 is formed in the fuel cell assembly 10 by outlet apertures 18 (shown in FIG. 2) formed in the fuel cell plates 12. The fuel cell plates 12 are stacked with the outlet aperture 18 of each plate 12 substantially aligned with the outlet aperture 18 of an adjacent plate or plates 12. It is understood that the diameter, quantity, and length of the outlet manifold 16 will depend on the size and quantity of outlet apertures 18 in the fuel cell plates 12 and the number of plates 12 stacked together in the fuel cell assembly 10.

Figure 2:
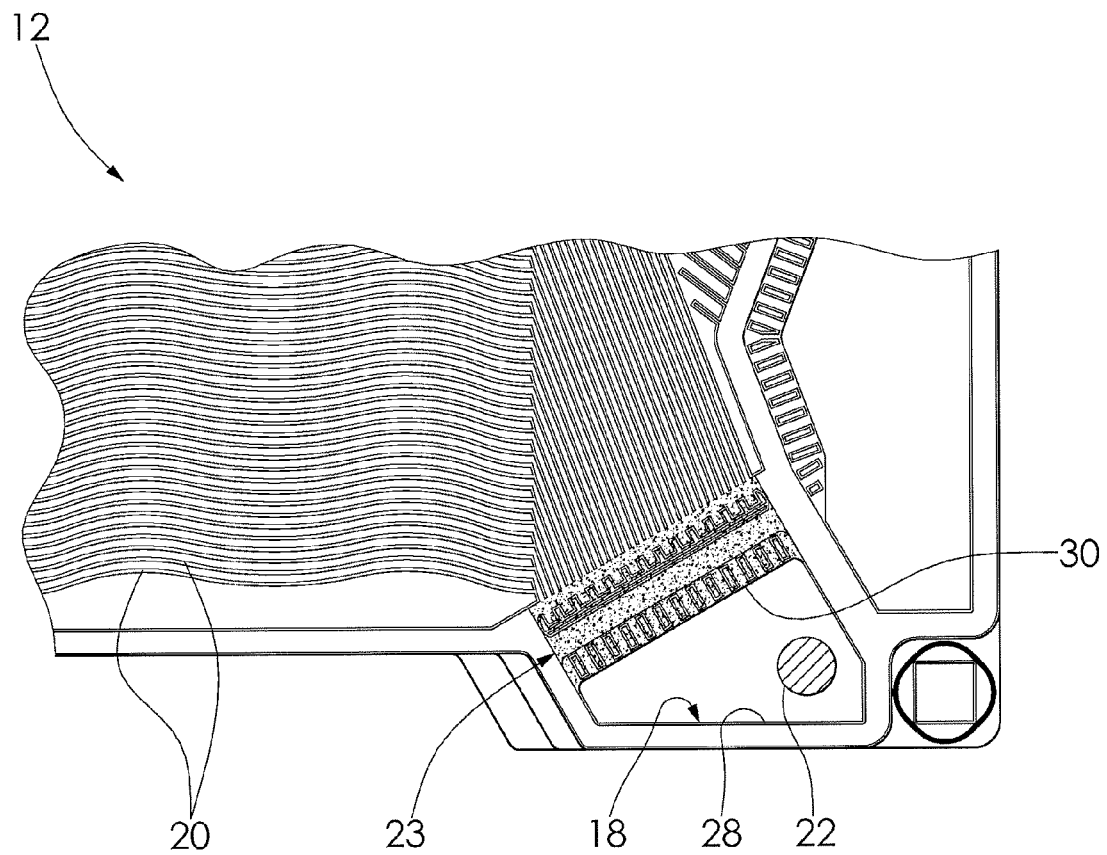
FIG. 2 is a fragmentary top plan view of a fuel cell plate of the fuel cell assembly illustrated in FIG. 1.

FIG. 2 shows a cathode side of one of the fuel cell plates 12. The fuel cell plate 12 includes the inlet aperture, the outlet aperture 18, a plurality of flow channels 20, a means for heating 22, and a hydrophilic portion 23 between the flow channels 20 and the outlet aperture 18. It is understood that the material of construction, size, shape, quantity, and type of fuel cell plates 12 in the fuel cell assembly 10, and the configuration of the fuel cell plates 12 within the fuel cell assembly 10, may vary based on design parameters such as the amount of electricity to be generated, the electrical demands of the electrical energy user to be powered by the fuel cell assembly 10, the volumetric flow rate of reactant gases through the fuel cell assembly 10, and other similar factors, for example. It is also understood that the fuel cell plate 12 shown in FIG. 2 may be used for an anode side (not shown) or for a cathode side of the fuel cell assembly 10. Further, the fuel cell plate 12 may have any number of inlet apertures and outlet apertures 18, as desired. In the embodiment shown, the flow channels 20 are undulated. However, the flow channels 20 may be substantially linear, serpentine, or other configurations, as desired.

In the embodiment shown, the means for heating 22 is an infrared heating device. The means for heating 22 is disposed in the outlet manifold 16 of the fuel cell assembly 10. As shown in FIG. 2, the means for heating 22 is disposed within the outlet manifold 16 adjacent an edge 28 of the outlet manifold 16 opposite an edge 30 of the outlet manifold 16 in fluid communication with the flow channels 20. The means for heating 22 may be disposed adjacent any edge of the outlet manifold 16, as desired such that radiant heat is directed toward the flow channels 20. The means for heating 22 may be disposed in either an anode side outlet manifold, both the anode side outlet manifold and a cathode side outlet manifold, and in inlet manifolds (not shown), as desired. It is understood that the means for heating 22 may be any conventional apparatus adapted to heat the outlet manifold 16.

In the embodiment shown, the hydrophilic portion 23 is a portion of the fuel cell plates 12 between the flow channels 20 and the outlet manifold 16 filled or surface coated with a hydrophilic material. The hydrophilic portion 23 may be any portion of the fuel cell plate 12, or the entire full cell plate 12 may be treated with the hydrophilic material, as desired. The hydrophilic material of the hydrophilic portion 23 is typically a porous material adapted to facilitate wicking of water away from the flow channels 20. The hydrophilic material may be any conventional hydrophilic material including inorganic and organic structures coated on a surface of the fuel cell plates 12. Examples of suitable hydrophilic coatings include, but are not limited to, metal oxides. Suitable metal oxides include, for example, $SiO_2$, $HfO_2$, $ZrO_2$, $Al_2O_3$, $SnO_2$, $Ta_2O_5$, $Nb_2O_5$, $MoO_2$, $IrO_2$, $RuO_2$, metastable oxynitrides, nonstoichiometric metal oxides, oxynitrides, and derivatives thereof, including carbon chains or including carbon-based groups, polar groups, and mixtures thereof.

Generally, during operation of a fuel cell power system, a stream of hydrogen is fed into the anode side of the fuel cell assembly 10. Concurrently, a stream of oxygen is fed into the cathode side of the fuel cell assembly 10. On the anode side, the hydrogen in the hydrogen stream is catalytically split into protons and electrons. The oxidation half-cell reaction is represented by: $H_2 \leftrightarrow 2H^+ + 2e^-$. In a polymer electrolyte membrane fuel cell, the protons permeate through the membrane to the cathode side. The electrons travel along an external load circuit to the cathode side creating the current of electricity of the fuel cell assembly 10. On the cathode side, the oxygen in the oxidant stream combines with the protons permeating through the membrane and the electrons from the external circuit to form water molecules. This reduction half-cell reaction is represented by: $4H^+ + 4e^- + O_2 \leftrightarrow 2H_2O$. Anode exhaust from the anode side is typically recirculated through the system to maintain high anode stoichiometric ratio and low hydrogen emissions.

Cathode exhaust from the cathode side is exhausted to atmosphere.

A control module (not shown) regulates the conditions of the hydrogen stream, oxygen stream, and exhaust streams by operating various control valves (not shown), and compressors (not shown) in response to signals from pressure sensors (not shown) and electrical power sensors (not shown) connected to the fuel cell assembly 10.

When the invention according to the first embodiment is in operation, the above reactions take place within the fuel cell assembly 10, and droplets of liquid water are formed in the channels 20 of the fuel cell plates 12 on the cathode sides of the fuel cell assembly 10. Some water also may be transported into the anode flow channels, or may form in the anode channels via condensation resulting from consumption of the hydrogen. It is understood that the operation as described herein for the cathode side is similar to operation for the anode side of the fuel cell assembly 10. The air stream flowing through the cathode side causes the water droplets to flow through the channels 20, toward the outlet manifold 16. Water vapor also flows towards the outlet manifold 16. The hydrophilic portion 23 is adapted to provide a capillary path from the flow channels 20 to the outlet manifold 16 and to facilitate a wicking of the water away from the flow channels 20.

To militate against the water droplets and vapor condensing and collecting at the edge 30 of the outlet aperture 18, the means for heating 22 is caused to heat the edge 30 of the fuel cell plates 12 with irradiative infrared heat to heat and evaporate the condensed water. The exhaust gas streams purge the evaporated water vapor out of the fuel cell assembly 10 through the outlet manifold 16. It is understood that a controlling means (not shown) in communication with the means for heating 22 may be used to regulate the use of the means for heating 22 based on an amount of water sensed in the outlet manifold 16, an assembly voltage, a temperature of the fuel cell plates 12, or a combination thereof. The controlling means may be any conventional controlling means such as a water sensor, an assembly voltage sensor, or a thermocouple, for example, as desired.

The hydrophilic portion 23 facilitates the transport of condensed liquid water through the fuel cell plates 12. The hydrophilic portion 23 provides a capillary transport path between the ends of flow channels 20 to the outlet manifold 16. By locally evaporating the liquid water at the outlet manifold 16, a saturation gradient in the porous hydrophilic portion 23 results. The saturation gradient thereby generates a driving force for the water in the material to flow from the fuel cell plates 12 through the outlet manifold 16 to equilibrate the saturation level in the hydrophilic portion 23. To more efficiently heat the edge 30 of the manifold 16 and the hydrophilic material of the hydrophilic portion 23, the hydrophilic portion 23 may be a flat black color to absorb infrared radiation. The exhaust gas streams purge the evaporated water vapor out of the fuel cell assembly 10 through the outlet manifold 16. It is understood that a controlling means (not shown) in communication with the means for heating 22 may be used to regulate the use of the means for heating 22 based on an amount of water sensed in the outlet manifold 16, an assembly voltage, a temperature of the fuel cell plates 12, or a combination thereof. The controlling means may be any conventional controlling means such as a water sensor, an assembly voltage sensor, or a thermocouple, for example, as desired.

The means for heating 22 is adapted to heat the edge 30 of the outlet manifold 16 without substantially heating a remainder of the fuel cell plates 12, thereby minimizing both a temperature increase of a coolant flowing through the fuel cell assembly 10 and a negative effect on ohmic resistance, sometimes measured by high frequency response (HFR). By reducing the accumulation of condensation at the outlet manifold 16, the following may be minimized and militated against: flow misdistributions caused by the blocked outlet manifold 16; nitrogen stagnation near outlet manifolds on the anode side; corrosion of the cathode catalyst as a result of anode hydrogen starvation; start up time of the fuel cell assembly 10; and damage caused to the fuel cell assembly 10 by gas starvation due to ice formed on the fuel cell plates 12. Additionally, because the water accumulated in the flow channels 20 and at the outlet manifolds 16 is minimized by the means for heating 22, an amount of fluid used to purge the fuel cell assembly 10 may be minimized, thereby militating against a drying of the membranes (not shown) of the membrane electrode assemblies (not shown) caused by long purge cycles to remove water from the system, thereby causing poor performance during start-up.

Figure 3:
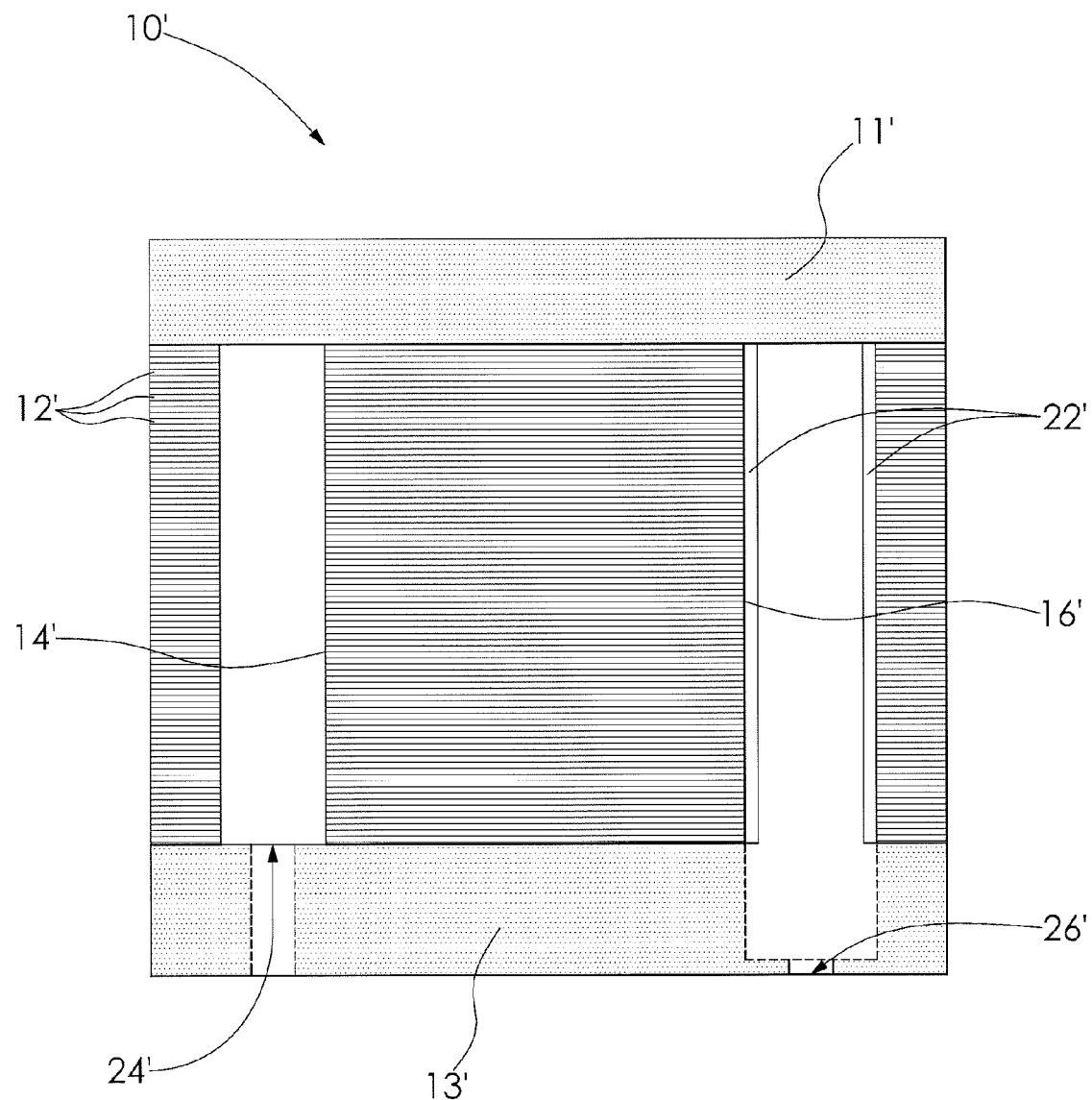
FIG. 3 is a cross-sectional elevational view of a fuel cell assembly including a means for heating according to another embodiment of the invention.

FIG. 3 shows a fuel cell assembly 10' according to an embodiment of the invention similar to the fuel cell assembly 10 of FIG. 1 except as described below. Like the structure from FIG. 1, FIG. 3 includes reference numerals including prime symbols ('). The fuel cell assembly 10' includes a plurality of fuel cell plates 12' disposed between a top end plate 11' and a bottom end plate 13'. An inlet manifold 14' and an outlet manifold 16' are formed in the fuel cell assembly 10'.

The inlet manifold 14' includes an inlet 24'. The inlet manifold 14' is formed in the fuel cell assembly 10' by inlet apertures (not shown) formed in each of the fuel cell plates 12'. The fuel cell plates 12' are stacked with the inlet aperture of each fuel cell plate 12' substantially aligned with the inlet aperture of an adjacent fuel cell plate or plates 12'. It is understood that the diameter, quantity, and length of the inlet manifold 14' will depend on the size and quantity of the inlet apertures in the fuel cell plates 12' and the number of plates 12' stacked in the fuel cell assembly 10'.

The outlet manifold 16' includes an outlet 26'. The outlet manifold 16' is formed in the fuel cell assembly 10' by outlet apertures 18' (shown in FIG. 4) formed in the fuel cell plates 12'. The fuel cell plates 12' are stacked with the outlet aperture 18' of each plate 12' substantially aligned with the outlet aperture 18' of an adjacent plate or plates 12'. It is understood that the diameter, quantity, and length of the outlet manifold 16' will depend on the size and quantity of outlet apertures 18' in the fuel cell plates 12' and the number of plates 12' stacked together in the fuel cell assembly 10'.

Figure 4:
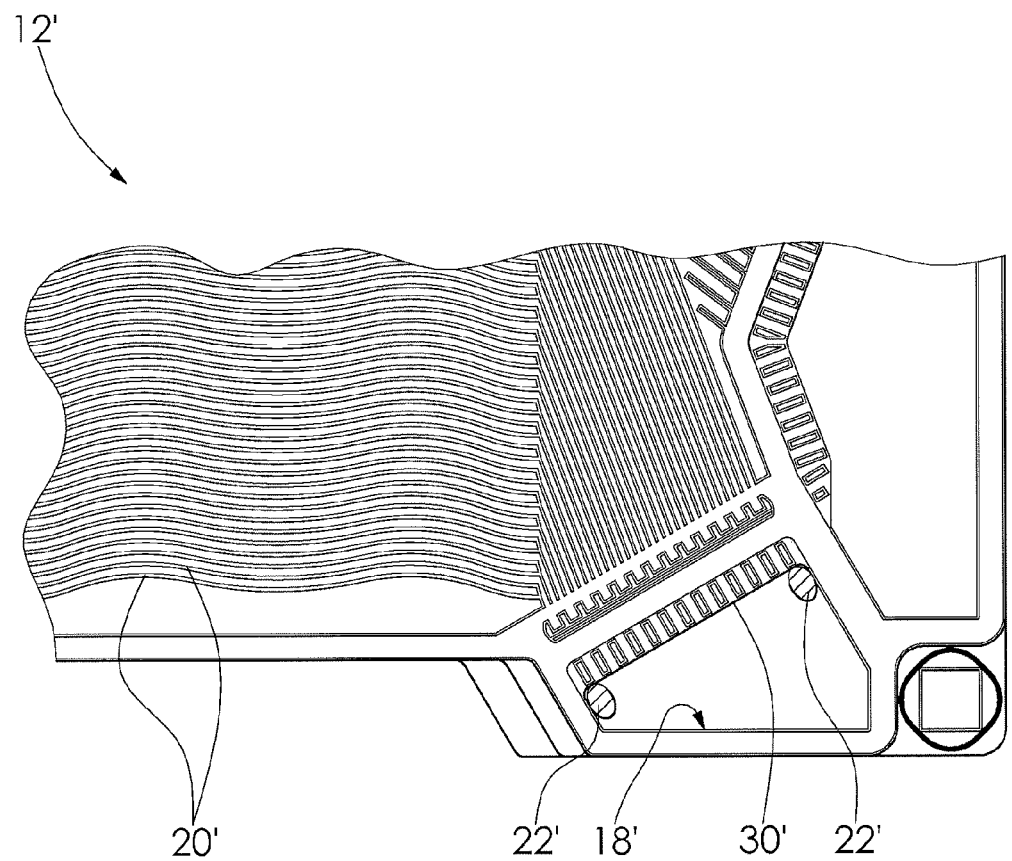
FIG. 4 is a fragmentary top plan view of a fuel cell plate of the fuel cell assembly illustrated in FIG. 3.

FIG. 4 shows a cathode side of one of the fuel cell plates 12'. The fuel cell plate 12' includes the inlet aperture, the outlet aperture 18', a plurality of flow channels 20', and a means for heating 22'. It is understood that the material of construction, size, shape, quantity, and type of plates 12' in the fuel cell assembly 10', and the configuration of the fuel cell plates 12' within the fuel cell assembly 10', may vary based on design parameters such as the amount of electricity to be generated, the electrical demands of the electrical energy user to be powered by the fuel cell assembly 10', the volumetric flow rate of reactant gases through the fuel cell assembly 10', and other similar factors, for example. It is also understood that the plate 12' shown in FIG. 4 may be used for an anode side (not shown) or for a cathode side of the fuel cell assembly 10'. Further, it is understood that the plate 12' may have any number of inlet apertures and outlet apertures 18', as desired. In the embodiment shown, the flow channels 20' are undulated. However, the flow channels 20' may be substantially linear, serpentine, or other configurations, as desired.

In the embodiment shown, the means for heating 22' is a heating element. The means for heating 22' is disposed in the outlet manifold 16' of the fuel cell assembly 10'. As shown in FIG. 4, the means for heating 22' is disposed within the outlet manifold 16' adjacent an edge 30' of the outlet manifold 16' in fluid communication with the flow channels 20'. The means for heating 22' may be disposed adjacent any edge of the outlet manifold 16', as desired. It is understood that the means for heating 22' may be disposed in either an anode side outlet manifold or both the anode side outlet manifold and cathode side outlet manifold, as desired. The means for heating 22' may be electrically insulated to militate against an electrical short between the fuel cell plates 12', as desired. It is understood that the means for heating 22' may be any conventional heating element adapted to heat the outlet manifold 16'.

Generally, during operation of a fuel cell power system, a stream of hydrogen is fed into the anode side of the fuel cell assembly 10'. Concurrently, a stream of oxygen is fed into the cathode side of the fuel cell assembly 10'. On the anode side, the hydrogen in the hydrogen stream is catalytically split into protons and electrons. The oxidation half-cell reaction is represented by: $H_2 \leftrightarrow 2H^+ + 2e^-$. In a polymer electrolyte membrane fuel cell, the protons permeate through the membrane to the cathode side. The electrons travel along an external load circuit to the cathode side creating the current of electricity of the fuel cell assembly 10'. On the cathode side, the oxygen in the oxidant stream combines with the protons permeating through the membrane and the electrons from the external circuit to form water molecules. This reduction half-cell reaction is represented by: $4H^+ + 4e^- + O_2 \leftrightarrow 2H_2O$. Anode exhaust from the anode side is typically recirculated through the system to maintain high anode stoichiometric ratio and low hydrogen emissions.

Cathode exhaust from the cathode side is exhausted to atmosphere.

A control module (not shown) regulates the conditions of the hydrogen stream, oxygen stream, and exhaust streams by operating various control valves (not shown), and compressors (not shown) in response to signals from pressure sensors (not shown) and electrical power sensors (not shown) connected to the fuel cell assembly 10'.

When the invention according to the second embodiment is in operation, the above reactions take place within the fuel cell assembly 10', and droplets of liquid water are formed in the channels 20' of the fuel cell plates 12' on the cathode sides of the fuel cell assembly 10'. Some water also may be transported into the anode flow channels, or may form in the anode channels via condensation resulting from consumption of the hydrogen. It is understood that the operation as described herein for the cathode side is similar to operation for the anode side of the fuel cell assembly 10'. The air stream flowing through the cathode side causes the water droplets to flow through the channels 20', toward the outlet manifold 16'. Water vapor is also caused to flow towards the outlet manifold 16'.

To militate against the water droplets and vapor condensing and collecting at the edge 30' of the outlet aperture 18', the means for heating 22' is caused to heat the edge 30' of the fuel cell plates 12' with conductive heat applied directly to the edge 30' of the fuel cell plates 12' to heat and evaporate the condensed water.

The means for heating 22' is adapted to heat the edge 30' of the outlet manifold 16' without substantially heating a remainder of the fuel cell plates 12' thereby minimizing both a temperature increase of a coolant flowing through the fuel cell assembly 10' and a negative effect on ohmic resistance. By reducing the accumulation of condensation at the outlet manifold 16', the following may be minimized and militated against: flow misdistributions caused by the blocked outlet manifold 16'; nitrogen stagnation upstream of a blockage on the anode side; corrosion of the cathode catalyst due to hydrogen starvation; start up time of the fuel cell assembly 10'; and damage caused to the fuel cell assembly 10' by hydrogen starvation as a result of ice formed on the fuel cell plates 12'. Additionally, because the water accumulated in the flow channels 20' and at the outlet manifolds 16' is minimized by the means for heating 22', an amount of fluid used to purge the fuel cell assembly 10' may be minimized, thereby militating against a drying of the membranes (not shown) of the membrane electrode assemblies (not shown). From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A fuel cell assembly comprising:
a plurality of fuel cell plates, wherein each fuel cell plate includes a plurality of flow channels fluidly coupled to at least a first aperture formed therein, each of the first apertures formed by a first edge adjacent a periphery of the fuel cell plate and a second edge adjacent the flow channels of the fuel cell plate, the first edge spaced apart from the second edge, the first apertures of the fuel cell plates substantially aligned to form a first manifold in fluid communication with the flow channels, wherein a first fluid is caused to flow through the first manifold; and
a first heating apparatus disposed within the first manifold between the first edges and the second edges of the first apertures, said first heating apparatus in thermal communication with the second edges, wherein said first heating apparatus is adapted to heat the second edges without substantially heating a remainder of the fuel cell plates, including the first edges, to thereby melt ice formed in said assembly during a startup operation and militate against at least one of fluid condensation and ice formation in said fuel cell assembly.

2. The fuel cell assembly of claim 1, wherein said first heating apparatus is an infrared heating device.

3. The fuel cell assembly of claim 1, wherein said first heating apparatus is a heating element.

4. The fuel cell assembly of claim 1, wherein each of the fuel cell plates further includes a second aperture, the second apertures substantially aligned to form a second manifold in fluid communication with the flow channels and a source of second fluid.

5. The fuel cell assembly of claim 4, further including a second heating apparatus in thermal communication with an edge forming the second apertures, wherein said second heating apparatus is adapted to melt ice formed in said assembly during a startup operation and militates against at least one of fluid condensation and ice formation in said fuel cell assembly.

6. The fuel cell assembly of claim 1, wherein at least a portion of the fuel cell plates of said fuel cell assembly are treated with a hydrophilic material.

7. The fuel cell assembly of claim 6, wherein the hydrophilic material is one of a $SiO_2$, $HfO_2$, $ZrO_2$, $Al_2O_3$, $SnO_2$, $Ta_2O_5$, $Nb_2O_5$, $MoO_2$, $IrO_2$, and $RuO_2$.

8. The fuel cell assembly of claim 1, further including a porous hydrophilic material disposed between the flow channels and the first manifold of the fuel cell plates, wherein said porous hydrophilic material is adapted to cause condensation to flow from the flow channels to the second edges forming the first apertures of the fuel cell plates and through the first manifold.

9. A fuel cell assembly comprising:
a plurality of fuel cell plates, wherein each plate includes a plurality of flow channels fluidly coupled to at least two apertures formed therein, each of the apertures formed by a first edge adjacent a periphery of the fuel cell plate and a second edge adjacent the flow channels of the fuel cell plate, the first edge spaced apart from the second edge, the apertures of the fuel cell plates substantially aligned to form a first manifold in fluid communication with the flow channels and a second manifold in fluid communication with the flow channels, wherein a first fluid is caused to flow through the first manifold and a second fluid is caused to flow through the second manifold; and
a plurality of heating apparatuses disposed within the first manifold and the second manifold between the first edges and the second edges of the apertures, said heating apparatuses in thermal communication with the second edges, wherein said heating apparatuses are adapted to heat the second edges without substantially heating a remainder of the fuel cell plates, including the first edges, to thereby militate against at least one of fluid condensation and ice formation in said fuel cell assembly.

10. The fuel cell assembly of claim 9, wherein said plurality of heating apparatuses includes an infrared heating device.

11. The fuel cell assembly of claim 9, wherein said plurality of heating apparatuses includes a heating element.

12. The fuel cell assembly of claim 9, wherein the fuel cell plates of said fuel cell assembly are treated with a hydrophilic material.

13. The fuel cell assembly of claim 12, wherein the hydrophilic material is one of $SiO_2$, $HfO_2$, $ZrO_2$, $Al_2O_3$, $SnO_2$, $Ta_2O_5$, $Nb_2O_5$, $MoO_2$, $IrO_2$, and $RuO_2$.

14. The fuel cell assembly of claim 9, further including a porous hydrophilic material disposed between the flow channels and the first manifold of the fuel cell plates, wherein said porous hydrophilic material is adapted to cause condensation to flow from the flow channels to the second edges forming the first apertures of the fuel cell plates and through the first manifold.

15. A fuel cell assembly comprising:
a plurality of fuel cell plates, wherein each plate includes a plurality of flow channels fluidly coupled to at least a first aperture formed therein, each of the first apertures formed by a first edge adjacent a periphery of the fuel cell plate and a second edge adjacent the flow channels of the fuel cell plate, the first edge spaced apart from the second edge, the apertures of the fuel cell plates substantially aligned to form a first manifold in fluid communication with the flow channels, wherein a first fluid is caused to flow through the first manifold;
a first heating apparatus disposed within the first manifold between the first edges and the second edges of the first apertures, said first heating apparatus in thermal communication with the second edges, wherein the first heating apparatus is adapted to heat the second edges without substantially heating a remainder of the fuel cell plates, including the first edges, to thereby melt ice formed in said assembly during a startup operation and militate against at least one of fluid condensation and ice formation in said fuel cell assembly; and
a hydrophilic material disposed on at least a portion of the fuel cell plates, wherein said porous hydrophilic material is adapted to facilitate the flow of condensation from the flow channels to the second edges of the fuel cell plates.

16. The fuel cell assembly of claim 15, wherein said first heating apparatus is one of an infrared heating device and a heating element, and when the first heating apparatus is an infrared heating device each fuel cell plate further comprises a hydrophilic portion between the flow channels and the first apertures, the hydrophilic portion comprising a flat black color to absorb infrared radiation.

17. The fuel cell assembly of claim 15, wherein each of the fuel cell plates further includes a second aperture, the second apertures substantially aligned to form a second manifold in fluid communication with the flow channels and a source of second fluid.

18. The fuel cell assembly of claim 17, further including a second heating apparatus in thermal communication with the second edges of the apertures, wherein the heated second manifold militates against at least one of vapor condensation and ice formation in said fuel cell assembly.

19. The fuel cell assembly of claim 2, wherein each fuel cell plate further comprises a hydrophilic portion between the flow channels and the first apertures, the hydrophilic portion comprising a flat black color to absorb infrared radiation.

20. The fuel cell assembly of claim 10, wherein each fuel cell plate further comprises a hydrophilic portion between the flow channels and the apertures, the hydrophilic portion comprising a flat black color to absorb infrared radiation.

* * * * *